(12) United States Patent
Hu et al.

(10) Patent No.: US 8,149,792 B2
(45) Date of Patent: Apr. 3, 2012

(54) ALLOCATION OF SPREADING CODES FOR TELECOMMUNICATIONS CHANNELS

(75) Inventors: Rong Hu, Sollentuna (SE); Jinhua Liu, Beijing (CN); Eva Englund, Linkoping (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 462 days.

(21) Appl. No.: 12/514,964

(22) PCT Filed: Nov. 15, 2006

(86) PCT No.: PCT/SE2006/050477
§ 371 (c)(1),
(2), (4) Date: May 14, 2009

(87) PCT Pub. No.: WO2008/060207
PCT Pub. Date: May 22, 2008

(65) Prior Publication Data
US 2010/0069077 A1    Mar. 18, 2010

(51) Int. Cl.
*H04B 7/216* (2006.01)
(52) U.S. Cl. ........................................ 370/335
(58) Field of Classification Search .................. None
See application file for complete search history.

(56) References Cited

U.S. PATENT DOCUMENTS

| 7,907,575 | B2 * | 3/2011 | Kim et al. | 370/335 |
| 7,986,675 | B2 * | 7/2011 | Kim et al. | 370/335 |
| 2005/0171984 | A1 * | 8/2005 | Wang et al. | 708/100 |
| 2005/0226267 | A1 * | 10/2005 | Pedersen et al. | 370/465 |
| 2007/0008933 | A1 * | 1/2007 | Braun et al. | 370/335 |

FOREIGN PATENT DOCUMENTS
WO    WO 2006/085800 A1    8/2006

OTHER PUBLICATIONS

International Search Report dated Sep. 25, 2007 (6 pages).
International Preliminary Report on Patentability dated Feb. 23, 2009 (8 pages).
Raymond Kwan et al., "The Effect of Code-Multiplexing on the High Speed Downlink Packet Access (HSDPA) in a WCDMA Network", 2003 IEEE, pp. 1728-1732.
Rujipun Assarut et al., "Region Division Assignment of Orthogonal Variable-Spreading-Factor Codes in W-CDMA", 2001 IEEE, pp. 1884-1888.

* cited by examiner

*Primary Examiner* — Anh-Vu Ly
(74) *Attorney, Agent, or Firm* — Myers Bigel Sibley & Sajovec, PA

(57) ABSTRACT

In a radio access network (10) comprising a radio network controller node (26) and a base station node (28), a code tree has spreading codes which are allocatable between high speed downlink shared (HS-DSCH) channels and dedicated (DCH) channels. According to one aspect of the technology, use of the spreading codes of the code tree is monitored and an HS-DSCH channel is allocated a free spreading code which is non-adjacent to a spreading code already allocated to the HS-DSCH channels. In some example implementations, the free, non-adjacent spreading code is allocated so that more than one high speed channel user can use the spreading codes. In other example implementations, the free, non-adjacent spreading code is allocated so that one user uses the spreading codes by using more than one HS-SCCH channel. Preferably the non-adjacent spreading code is released from the HS-DSCH channel when the non-adjacent spreading code is needed for use by a DCH channel.

12 Claims, 5 Drawing Sheets

ALLOCATION OF SPREADING CODES FOR TELECOMMUNICATIONS CHANNELS

BACKGROUND

I. Technical Field

The present invention pertains generally to telecommunications, and particularly to telecommunications scheduling based on code tree allocation.

II. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("'cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology.

As wireless Internet services have become popular, various services require higher data rates and higher capacity. Although UMTS has been designed to support multi-media wireless services, the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSDPA) for the downlink, which was introduced in 3GPP WCDMA specification Release 5. HSDPA features a high speed channel (HSC) controller that functions, e.g., as a high speed scheduler by multiplexing user information for transmission over the entire HS-DSCH bandwidth in time-multiplexed intervals (called transmission time intervals (TTI)). Since HSDPA uses code multiplexing, several users can be scheduled at the same time.

Concerning High Speed Downlink Packet Access (HSDPA) generally, see, e.g., 3GPP TS 25.435 V7.1.0 (2006-06-16), 3rd Generation Partnership Project; Technical Specification Group Radio Access Network; UTRAN $I_{ub}$ Interface User Plane Protocols for Common Transport Channel Data Streams (Release 7), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.321 V7.1.0 (2006-06-23). 3rd Generation Partnership Project; Technical Specification Group Radio Access Network; Medium Access Control (MAC) protocol specification (Release 7); 3GPP TS 25.331 V7.1.0 (2006-06-23), 3rd Generation Partnership Project; Technical Specification Group Radio Access Network; Radio Resource Control (RRC); Protocol Specification (Release 7); 3GPP TS 25.425 V7.1.0 (2006-06-16), 3rd Generation Partnership Project; Technical Specification Group Radio Access Network; UTRAN Iur interface user plane protocols for Common Transport Channel data streams (Release 7); and 3GPP TS 25.433 V7.1.0 (2006-06-20), 3rd Generation Partnership Project; Technical Specification Group Radio Access Network; UTRAN Iub interface Node B Application Part (NBAP) signaling (Release 7).

The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6.

The new channels of HSDPA and HSUPA are designed to support IP-based communication efficiently, providing enhanced end-user performance and increased system capacity. Although originally designed for interactive and background applications, they provide as good or even better performance for conversational services than the existing circuit switched (CS) bearers.

The Third Generation Partnership Project (3GPP) documents specify that an HS-DSCH allocation can have a maximum of fifteen (HS-PDSCH) codes, each of them with Spreading Factor (SF) 16. The transport channel HS-DSCH is mapped onto one or several physical channels (HS-PDSCHs), each using one SF-16 code. Similarly, a dedicated transport channel (DCH) is mapped onto a dedicated physical channel (DPCH) that uses a certain Spreading Factor in the range of SF256 to SF4. The code tree contains sixteen (16) SF-16 codes and thus, when the maximum of fifteen HS-PDSCH channels are allocated, only one SF-16 code remains for other channels. The SF-16 code allocated to the other channels may be further spread for individual channels.

There is thus a trade-off in the number of spreading codes that are made available for HS-DSCH channels. For example, allocating a higher number of codes for HS-DSCH channels results in fewer channels being available for allocations for dedicated transport channels (DCH). In other words, if there is a high DCH demand, allocating fewer codes for HS-DSCH channels is beneficial from a service availability point of view. On the other hand, if there are a high number of users allocated to HSDPA transmissions, it is preferable to allocate a high number of HS-PDSCH codes, as this will provide high bit-rate connections and increased end-user experience.

The controlling radio network controller (CRNC) has control over the complete code tree situation. Therefore, the CRNC provides the configuration of the HS-DSCH, that is, how many (SF-16) codes should be used. The CRNC controls this through the 3GPP-specified Node B Application Part (NBAP) protocol over the $I_{ub}$ interface, and the HS-DSCH is set up according to a configuration message sent to the Node B (i.e., the base station node). The algorithm for making the allocations, however, is not standardized and different approaches may be utilized.

As a first example conventional approach, the allocations may be made in a static manner in which a fixed number of codes are allocated for HSDPA transmissions, and any change to the allocation requires a reconfiguration by the system operator.

As another or second example conventional approach, the spreading code allocations may also be made dynamically by the CRNC based, for example, on measurements in the Node B and the RNC.

As a third example approach, discretionary code allocation is performed by the NodeB which allocates and de-allocates additional codes for HS-DSCH in addition to the number of codes given from the RNC. This third approach treats the HS-PDSCH codes allocated by the RNC as a minimum number of HS-PDSCH codes allocated to the NodeB, and allocates and reallocates unused codes without communicating with the RNC. In this third approach, the HS-PDSCH codes are allocated consecutively from one side of the code tree and therefore the RNC preferably allocates DCH's from the opposite end of the code tree from the HS-PDSCH codes, essentially in the manner illustrated in FIG. 5.

Each of the example approaches discussed above has deficiencies. With a fixed configuration of HS-PDSCH codes as in the first approach, a trade-off is necessary. The allocation of HS-PDSCH codes must be large enough to handle arriving HS-DSCH traffic. On the other hand, the allocation must be small enough to prevent high DCH blocking. In a fluctuating traffic environment, it is hard to optimally set how many codes should be fixed for HS-PDSCH. In addition, any change to the allocation requires a manual reconfiguration by the system operator.

With a dynamic allocation of codes as in the second approach, the RNC optimally needs information from the Node B regarding Node B capabilities and utilization of HS-PDSCH codes. Further, a dynamic allocation algorithm in the RNC must consider a number of criteria from the RNC such as the rate of DCH code blocking, and also a number of criteria from the Node B such as power availability. Moreover, if the algorithm were to change the allocation of the number of HS-PDSCH codes too frequently (for example, triggered on single events), the allocation and de-allocation may become too "bursty", with excess signaling over the $I_{ub}$ interface. However, if the allocation rate is too low, the process experiences more of the problems associated with the fixed (first) approach. Therefore, the algorithm must also attempt to find an optimum allocation rate. Thus, the problem quickly becomes very complex.

In the solution of discretionary code allocation of the third approach, in which the HS-PDSCH codes are allocated consecutively from one side of the code tree and DCH codes are allocated from the opposite end of the code tree to the HS-PDSCH codes, it could happen that some DCH users can stop HS code resource expansion even when some codes right to these DCH users are free (assuming that the directionality of the code assignment is such that DCH codes are allocated from the right end of the code tree). Of course the RNC may employ a reallocation strategy to actively re-allocate users to increase the likelihood of having consecutive free codes adjacent to the HS-PDSCH codes. However, it is costly from the signaling overhead perspective between RNC and NodeB, and there is a risk of a DCH user being dropped.

What is needed, therefore, and an object of the present invention, are one or more of apparatus, methods, and techniques for efficiently and effectively allocating spreading codes between HS-DSCH channels and DCH channels of a radio access network.

BRIEF SUMMARY

In a radio access network comprising a radio network controller node and a base station node, a code tree has spreading codes which are allocatable between high speed downlink shared (HS-DSCH) channels and dedicated (DCH) channels. According to one aspect of the technology, use of the spreading codes of the code tree is monitored and an HS-DSCH channel is allocated a free spreading code which is non-adjacent to a spreading code already allocated to the HS-DSCH channels.

According to an example method of the technology, an initial number of spreading codes are allocated for use by the HS-DSCH channels. For a remaining number of spreading codes, the remaining spreading codes are allocated to HS-DSCH channels in a first direction across the code tree and in a second direction to DCH channels across the code tree. When it is determined that the code tree has a free spreading code which is non-adjacent to a spreading code allocated to the HS-DSCH channels; the free non-adjacent spreading code is allocated to an HS-DSCH channel.

In some example implementations, the free, non-adjacent spreading code is allocated so that more than one high speed channel user can use the spreading codes. In other example implementations, the free, non-adjacent spreading code is allocated so that one user uses the spreading codes by using more than one HS-SCCH channel. Preferably the non-adjacent spreading code is released from the HS-DSCH channel when the non-adjacent spreading code is needed for use by a DCH channel.

According to another aspect of the technology, a base station node of a radio access network maintains a code tree of spreading codes that are allocatable between high speed downlink shared (HS-DSCH) channels and dedicated (DCH) channels and monitors use of the spreading codes of the code tree. The base station node is configured to allocate to an HS-DSCH channel a free spreading code which is non-adjacent to a spreading code allocated to the HS-DSCH channels. In one example implementation, to make such allocation the base station node is configured to allocate the spreading codes to HS-DSCH channels in a first direction across the code tree; to allocate the spreading codes to DCH channels in a second direction across the code tree: to monitor use of the spreading codes of the code tree for determining free spreading codes which are non-adjacent to a spreading code allocated to the HS-DSCH channels; and to allocate a free non-adjacent spreading code to an HS-DSCH channel.

The technology thus presents a solution in which additional free codes, not necessarily consecutive to the set of codes assigned by a radio network controller node, can be dynamically assigned to an HS-DSCH channel by, e.g., a scheduler of a base station node (Node-B). By informing the scheduler of the additional free codes, the one or more additional, non-consecutive free codes can be used as HS codes. Furthermore, the additional, non-consecutive free codes may be allocated to different HS users, or even to one HS user by using more than one HS-SCCH. The scheduler allocates additional HS-PDSCH codes from the unused codes without having to communicate with radio network controller node. When the additional HS-PDSCH codes are needed for DCH codes, the base station node immediately releases these codes for the DCH purpose.

The code-tree allocation is continuously monitored and if there are codes available for the HS-DSCH in addition to the codes allocated by the radio network control, the scheduler is informed about these codes. The scheduling algorithm may then take this information into account when deciding on whether or not to activate code multiplexing and/or additional HS-SCCH. By using more than one HS-SCCH, all of the free codes (e.g., of spreading factor 16), no matter they are adjacent or not, can be used as HS codes. They can be used by either different HS users or even one HS user in one transmission time interval (TTI).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc.

in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
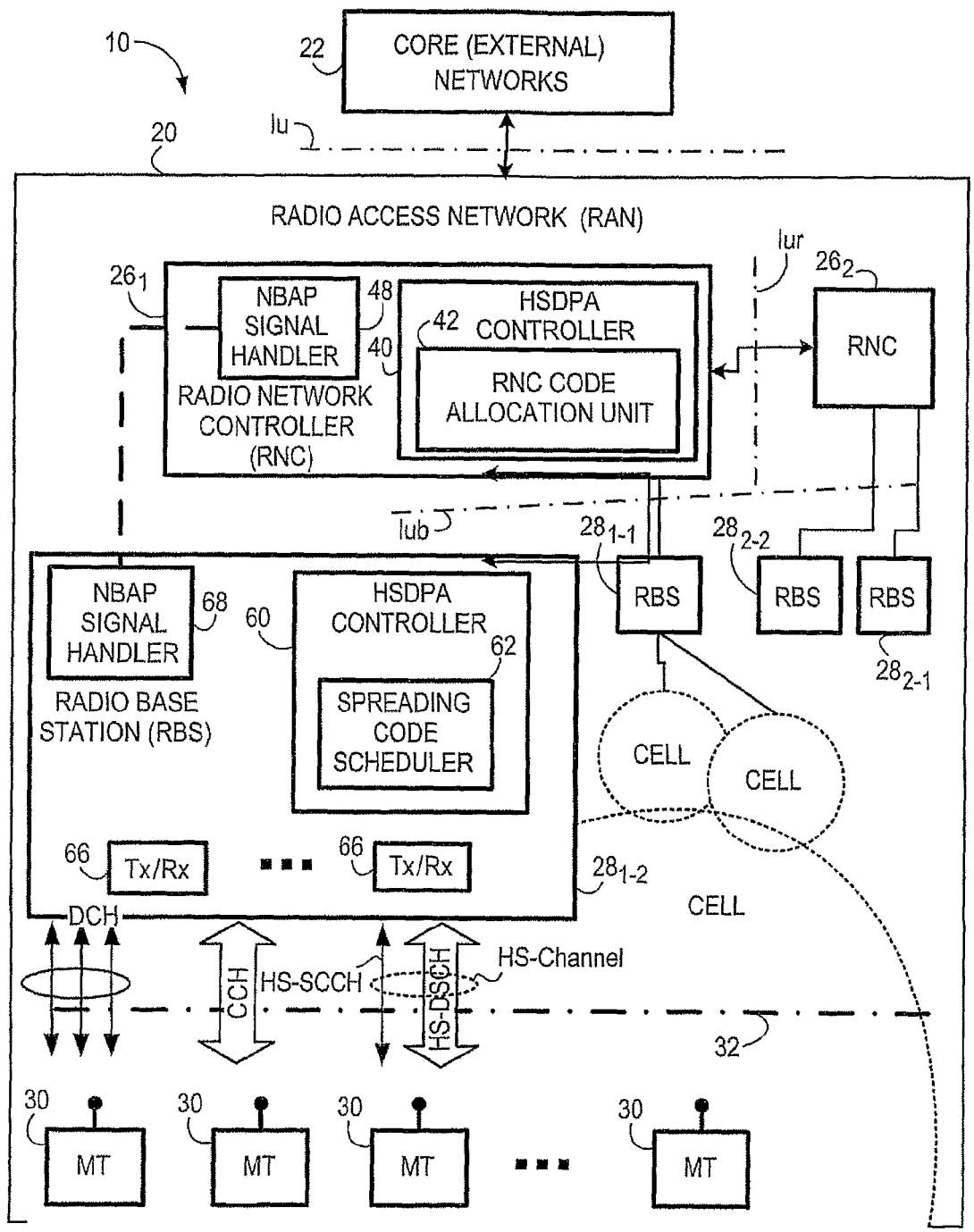
FIG. 1 is a diagrammatic view of an example embodiment of a mobile communications system in which the present technology may be advantageously employed.

The present technology is described in the non-limiting, example context of a telecommunications system 10 shown in FIG. 1. In the FIG. 1 example, a radio access network 20 is connected to one or more core (external networks) 22. The core networks 22 can include, for example, connection-oriented networks such as the Public Switched Telephone Network (PSTN) and/or the Integrated Services Digital Network (ISDN) and/or connectionless-oriented external core network such as (for example) the Internet.

In the particular, non-limiting example shown in FIG. 1, the radio access network (RAN) 20 is a UMTS Terrestrial Radio Access Network (UTRAN) and the interface with the external network is over the 1u interface. The radio access network (RAN) 20 includes one or more radio network controllers (RNCs) 26, e.g., radio network control nodes, and one or more radio base stations (RBS) 28. For sake of simplicity, the radio access network (RAN) 20 of FIG. 1 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard. RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover. FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node.

In the illustrated embodiments, for sake of simplicity each base station 28 is shown as serving one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

For sake of simplification, the cell of base station $28_{1-2}$ is depicted as a semicircle. Several mobile terminals (MT) 30 are shown as currently being served by the cell of radio base station (RBS) $28_{1-2}$. The mobile terminals (MT) 30 communicate with one or more cells or one or more base stations (BS) 28 over a radio or air interface 32. In differing implementations, the mobile terminals (MT) 30 can be known by different names, such as wireless terminal, mobile station (MS) or MS, user equipment unit (UE), handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting. Push-to-talk client etc. Preferably, at least for a UTRAN implementation of the radio access network (RAN) 20, radio access is based upon Wideband, Code Division Multiple Access (WCDMA) with individual radio channels allocated using WCDMA spreading codes. Of course, other access methods may be employed.

Different types of channels may exist between one of the base stations 28 and mobile terminals (MT) 30 for transport of control and user data across a radio or air interface 32. For example, in the forward or downlink direction, there are several types of broadcast channels and one or more control channels. While such broadcast channels and control channels are not shown in FIG. 1, FIG. 1 does illustrate in simplified form the existence of one or more common traffic channels (CCH), dedicated transport channels (DCH), and a high-speed shared channel(s) (HS-channel) which now is of particular interest. The high-speed shared channel(s) (HS-channel) may be a high-speed downlink shared channel (HS-DSCH) or a high-speed shared control channel (HS-SCCH). The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

The control node 26 configures the cell to support HSDPA. Thereafter it is up to the radio base station 28 to perform other activities, such as (for example) to allocate power and the amount of codes needed at respective TTI transmissions. As shown in FIG. 1, control node 26 comprises an HSDPA controller 40 which, among other things, governs allocation and utilization of the high-speed downlink shared channel (HS-DSCH). An RNC code allocation unit 42, which can be situated in or comprise HSDPA controller 40 in the manner shown in FIG. 1 or which can be separate from HSDPA controller 40, maintains a code tree of spreading codes that are allocatable between high speed downlink shared (HS-DSCH) channels and dedicated (DCH) channels, and allocates an initial number of spreading codes for use by the HS-DSCH channels. The initial spreading code allocation of spreading codes for use by the HS-DSCH channels is communicated from controller node 26 to the base station node 28 through a NBAP signal handler 48 which comprises the control node 26. The HSDPA controller 40 and RNC code allocation unit 42, as well as NBAP signal handler 48, may be included with or separate from a node controller or processor the like which bears responsibility for overall node operation/coordination of control node 26. The person skilled in the art understands that control node 26 typically also includes other entities and functionalities, such as (for example) a handover unit, combiners and splitters for diversity purposes, and so forth.

FIG. 1 further shows that, among its various other constituent units and functionalities, radio base station (BS) 28 comprises an HSDPA controller 60, a spreading code scheduler 62; one or more transceiver (TX) 66; and a NBAP signal handler 68. The person skilled in the art will appreciate that base station node 28 typically also includes other entities and functionalities, such as (for example) an HSDPA flow controller, priority queues, various interfaces, and so forth.

Figure 2:
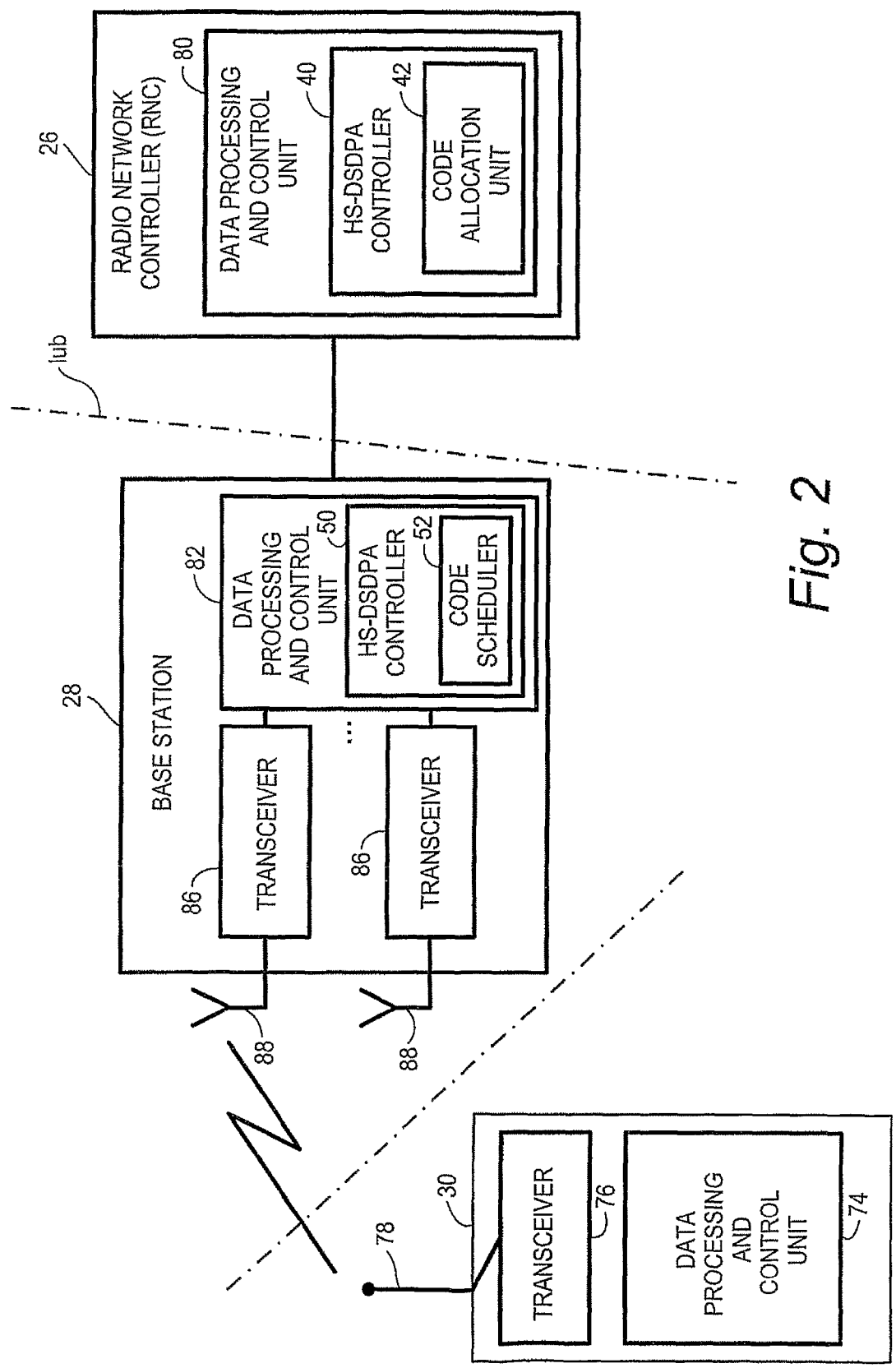
FIG. 2 is a simplified function block diagram of a portion of a UMTS Terrestrial Radio Access Network, including portions of a user equipment unit (UE) station; a radio network controller; and a base station.

FIG. 2 shows selected general aspects of mobile terminal (MT) 30 and illustrative nodes such as radio network controller 26 and base station 28. The user equipment unit (UE) 30 shown in FIG. 2 includes a data processing and control unit 74 for controlling various operations required by the user equipment unit (UE). The UE's data processing and control unit 74 provides control signals as well as data to a radio transceiver 76 connected to an antenna 78.

The example radio network controller 26 and base station 28 as shown in FIG. 2 are radio network nodes that each include a corresponding data processing and control unit 80 and 82, respectively, for performing numerous radio and data processing operations required to conduct communications between the RNC 26 and the user equipment units (UEs) 30. Part of the equipment controlled by the base station data processing and control unit 80 includes plural radio transceivers 86 connected to one or more antennas 88.

Thus, as generic represented in example fashion in FIG. 1 the HSDPA controller 40 and HSDPA controller 60, as well as RNC code allocation unit 42 and spreading code scheduler 62, may be implemented using individual hardware circuits, using software programs and data in conjunction with one or more suitably programmed digital (micro)processors or general purpose computers, using application specific circuitry (ASIC), and/or using one or more digital signal processors (DSPs) or controllers, given the meaning of these several of these terms as broadly discussed above.

In operation, the RNC code allocation unit 42 of control node 26 allocates a fixed number of HS-PDSCH codes to the NodeB (e.g., to radio base station (BS) 28) or dynamically allocates the number of HS-PDSCH codes and communicates this to the NodeB through NBAP, e.g., through the NBAP signal handlers 48 and 58.

The spreading code scheduler 62 of base station node 28 also maintains the code tree of spreading codes that are allocatable between high speed downlink shared (HS-DSCH) channels and dedicated (DCH) channels, and monitors use of the spreading codes of the code tree. As explained in more detail below, the base station node is configured to allocate to an HS-DSCH channel a free spreading code which is non-adjacent to a spreading code allocated to the HS-DSCH channels.

In the above regard, spreading code scheduler 62 of base station node 28 (Node B) treats the RNC's allocation as the minimum allocation of HS-PDSCH codes. In its allocation of codes, spreading code scheduler 62 preferably follows the principle that the HS-PDSCH codes are allocated from the left side to the right side of the code tree (e.g., in a first direction), while DCH codes are allocated from the right side to the left side of the code tree (e.g., in a second direction). As used herein, the phrase "first direction" can mean either (1) from the left side to the right side of the code tree, or (2) from the right side to the left side of the code tree, it being understood that the phrase "second direction" thus implies the opposite directionality. For sake of illustration, the ensuing examples assume the first direction to mean from the left side to the right side of the code tree.

To reduce the fraction of code tree, the sub code tree of SF16 for DCH users should be filled as much as possible. Such allocation strategy can be useful to get more consecutive HS-PDSCH codes that are needed for users, e.g., to download large files.

Figure 3A:
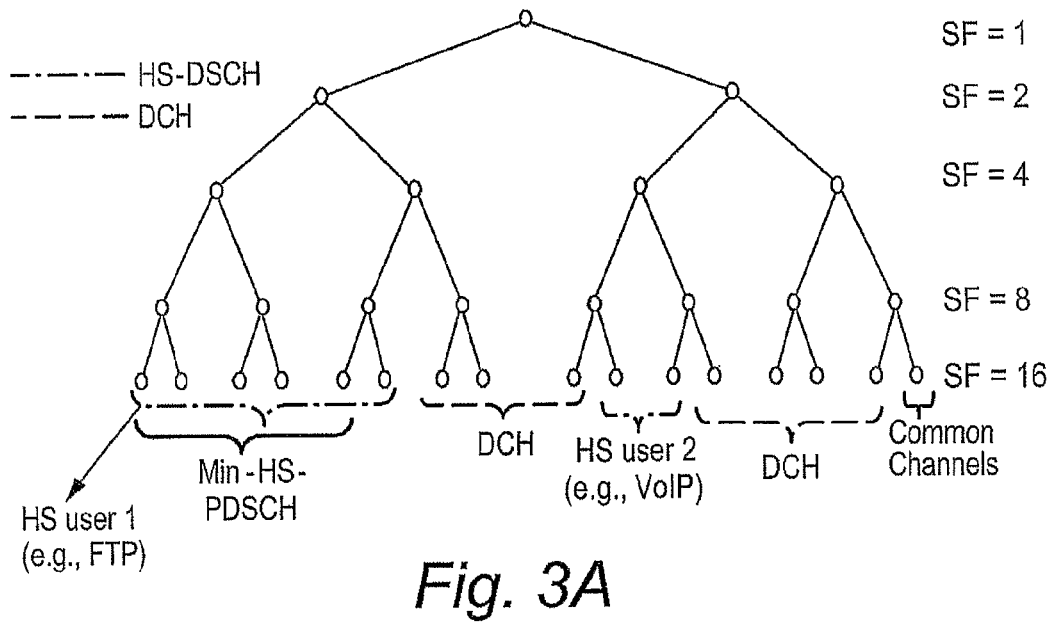
FIG. 3A and FIG. 3B are diagrammatic view of code trees and code assignment techniques according to two respective example embodiments.
Figure 5:
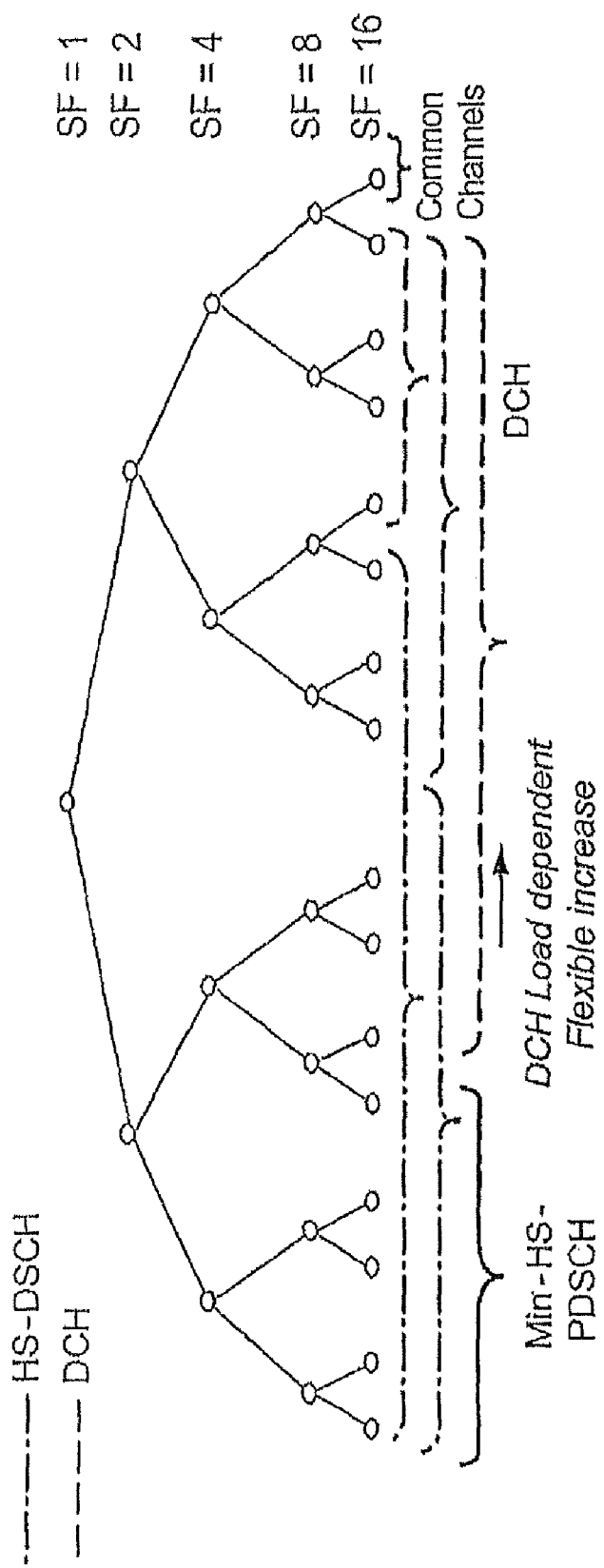
FIG. 5 is a diagrammatic view of a code tree and a code assignment technique according to a comparative embodiment.

The code tree allocation is continuously monitored by base station node 28 and if there are additional free codes that are not adjacent to HS-PDSCH codes, the spreading code scheduler 62 of the NodeB is informed. A scheduling algorithm of spreading code scheduler 62 may use this information as input to decide on how many users to schedule and/or how many HS-SCCH channels should be used. For example the scheduling algorithm may decide on scheduling additional users to make use of the non-adjacent codes (code multiplexing) in case there are any available. FIG. 3A illustrates how the NodeB scheduling algorithm of spreading code scheduler 62 may use the information of additional non-adjacent codes to allocate the code tree shared by HS users and DCH users. Different from that shown in FIG. 5, the codes may be well utilized by the DCH users and HS users.

A code multiplexing functionality of spreading code scheduler 62 makes it possible to send user data to more than one user in a single TTI. By monitoring the code usage, the scheduling algorithm of spreading code scheduler 62 can decide when to activate the code multiplexing functionality in order not to waste the code resource. FIG. 3A shows a code multiplexing case where the non-adjacent codes are allocated to different HS users. The code multiplexing functionality requires that a separate HS-SCCH be available for each user sharing code resources in a single TTI. The availability of non-adjacent code can be one factor to decide whether to invoke this code multiplexing. This can speed up the scheduler process to some extent since the scheduler does not have to execute some unnecessary actions if the code multiplexing functionality is not invoked.

Figure 3B:
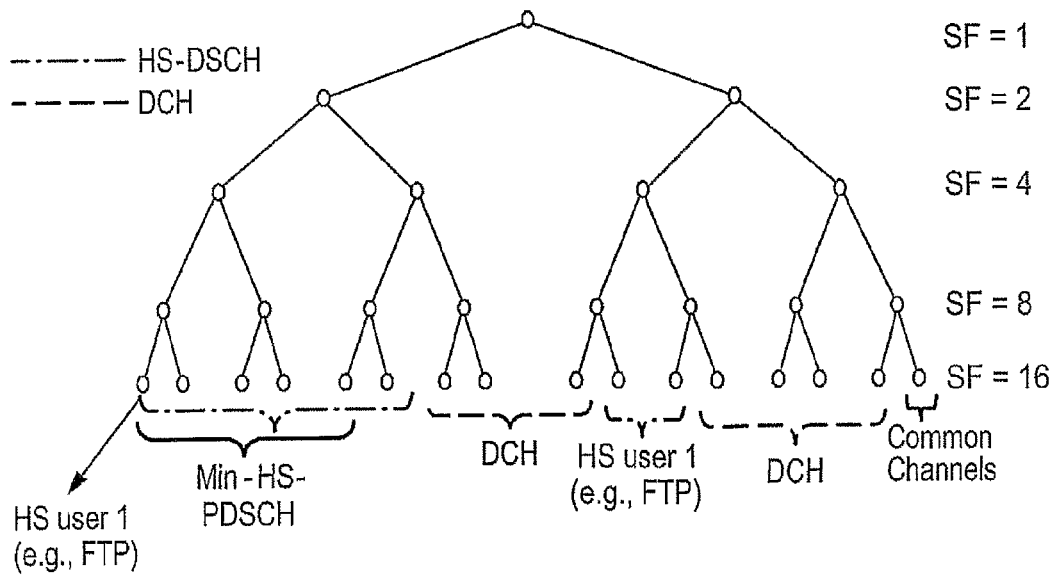

These codes are not necessarily allocated to different users even if they are not adjacent. The codes may also be allocated only to one HS user by using more than one HS-SCHH, as illustrated in FIG. 3B. In FIG. 3B, the free, non-adjacent spreading code is allocated so that one user uses the spreading codes by using more than one HS-SCCH channel.

According to 3GPP specifications, a mobile terminal 30 must be able to decode four HS-SCCHs in parallel, which means there is a possibility to use up to four HS-SCCHs to one HS user. The mobile terminal 30 needs to decode the data carried over HS-PDSCH data in parallel according to the information carried on the HS-SCCHs.

If the base station node 28 (NodeB) receives a request for an additional DCH from the RNC, the base station node 28 can immediately reduce the allocation of HS-PDSCH codes until back to the minimum HS-PDSCH codes. Preferably, those codes not closing to the left end of the code tree should be released first, which results in the consecutive codes for HS-PDSCH as many as possible.

Figure 4:
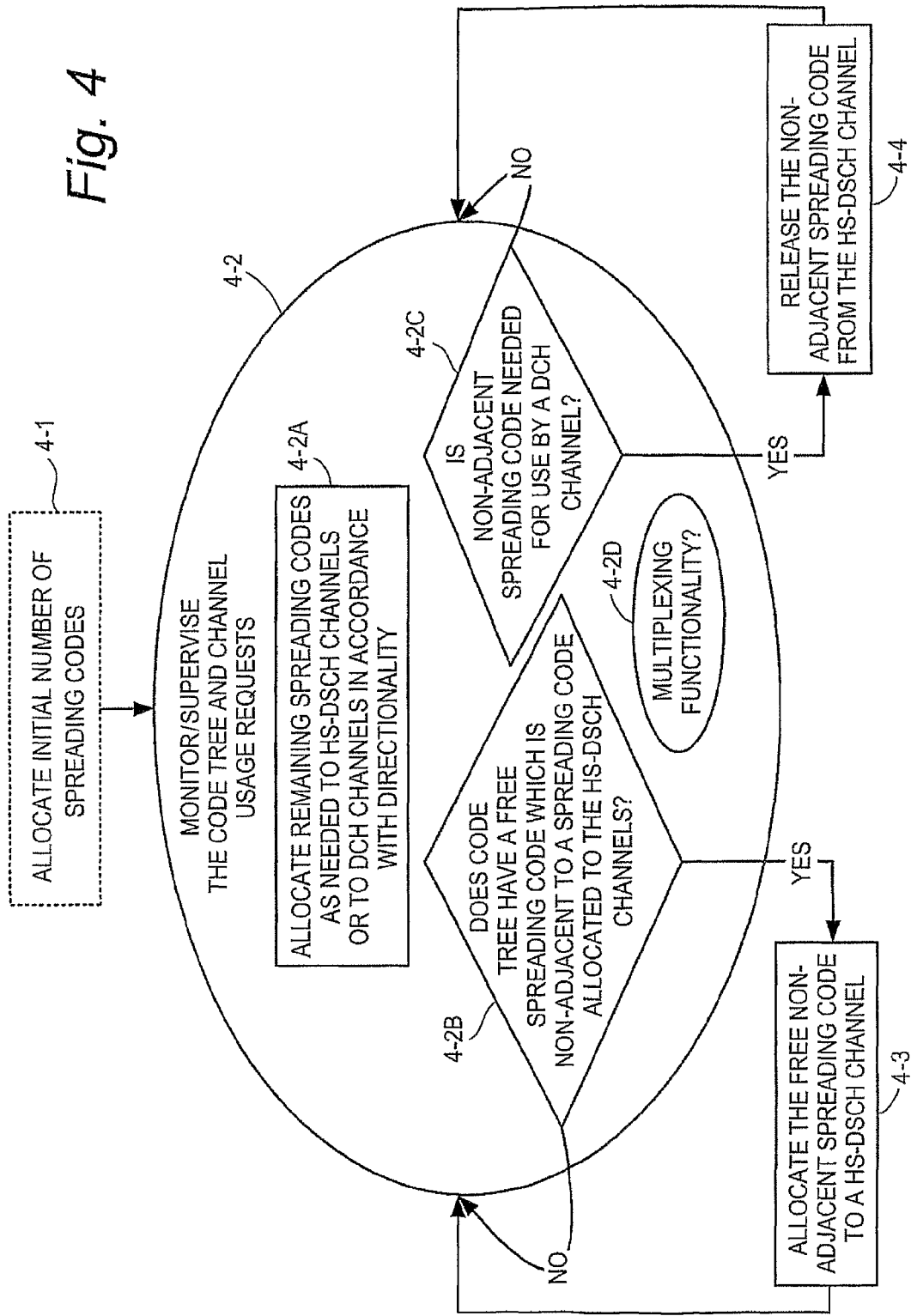
FIG. 4 is a flow chart showing basic, representative acts performed in conjunction with a spreading code allocation technique according to an example mode.

FIG. 4 illustrates selected example, basic steps, events, or actions (acts) involved in an example mode of spreading code allocation. The acts of FIG. 4 happen to be generic to the code allocation techniques of FIG. 3A and FIG. 3B. FIG. 4 shows act 4-1 as being preformed by RNC code allocation unit 42 (and accordingly in represented by broken lines). Other acts shown in FIG. 4 are performed by base station node 28, and include acts performed, e.g., by spreading code scheduler 62.

Act 4-1 depicts the fact that an initial number of spreading codes are/have been allocated (e.g., by RNC code allocation unit 42) for use by the HS-DSCH channels. Act 4-2 generally depicts the supervision and monitoring by base station node 28 of the code tree as well as traffic demand for spreading codes. As shown by act 4-2A, for the remaining number of spreading codes (the spreading codes not initially allocated), the remaining spreading codes are allocated to HS-DSCH channels in a first direction across the code tree and in a second direction to DCH channels across the code tree. Thus, as depicted by act 4-2A, spreading code scheduler 62 allocates the remaining spreading codes to HS-DSCH channels or to DCH channels as needed in accordance with such directionality.

In conjunction with the monitoring of act 4-2, it is determined as act 4-2B whether the code tree has a free spreading code which is non-adjacent to a spreading code allocated to the IS-DSCH channels. If the determination of act 4-2B is affirmative (e.g., if the code tree does have a free spreading code which is non-adjacent to a spreading code allocated to the HS-DSCH channels), as act 4-3 the spreading code scheduler 62 allocates the free non-adjacent spreading code to an HS-DSCH channel.

Also in conjunction with the monitoring of act 4-2, as act 4-2C a determination is made whether the non-adjacent spreading code is needed for use by a DCH channel. If the determination of act 4-2C is affirmative (e.g., if a non-adjacent spreading code is needed for use by a DCH channel), as act 4-4 the spreading code scheduler 62 releases the non-adjacent spreading code from the HS-DSCH channel.

As explained above, the scheduling algorithm of spreading code scheduler 62 can (by monitoring the code usage) decide when to activate the code multiplexing functionality, e.g., whether to send user data to more than one user in a single TTI. Act 4-2D of FIG. 4 illustrates the scheduling algorithm of spreading code scheduler 62 making a decision whether to activate the code multiplexing functionality. If the code multiplexing functionality, then (in the example manner illustrated by FIG. 3A) the free, non-adjacent spreading code is allocated so that more than one high speed channel user can use the spreading codes. If the determination at act 4-2D is to not activate the code multiplexing functionality, then it is possible to have a situation as that represented by FIG. 3B wherein the free, non-adjacent spreading code is allocated so that one user uses the spreading codes by using more than one HS-SCCH channel.

The technology described herein offers many advantages. For example, the technology renders more HS codes available, resulting in higher throughput and less delay. More GBR users, especially those with low rate (e.g. VoIP), might be supported as they normally need not so many codes. Moreover, the utilization of whole code tree is improved. Further, the technology requires no significant change in the 3GPP specs.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

The invention claimed is:

1. A method of operating a radio access network comprising a radio network controller node and a base station node, the method comprising:

maintaining a code tree of spreading codes that are allocatable between high speed downlink shared channels (HS-DSCH) and dedicated channels (DCH);

allocating an initial number of spreading codes for use by the HS-DSCH channels and, for a remaining number of spreading codes:

allocating the spreading codes to HS-DSCH channels in a first direction across the code tree;

allocating the spreading codes to DCH channels in a second direction across the code tree;

monitoring use of the spreading codes of the code tree for determining free spreading codes which are non-adjacent to a spreading code allocated to the HS-DSCH channels; and allocating a free non-adjacent spreading code to an HS-DSCH channel.

2. The method of claim 1, further comprising:

determining whether or not to activate a code multiplexing functionality, where the code multiplexing functionality facilitates allocating the free, non-adjacent spreading code so that more than one high speed channel user can use the spreading codes.

3. The method of claim 2, where the determining whether or not to activate the code multiplexing functionality comprises monitoring code usage.

4. The method of claim 1, where the free, nonadjacent spreading code is allocated so that more than one high speed channel user can use the spreading codes.

5. The method of claim 1, where the free, nonadjacent spreading code is allocated so that one user uses the spreading codes by using more than one HS-DSCH channel.

6. The method of claim 1, further comprising:
releasing the nonadjacent spreading code from the HS-DSCH channel when the non-adjacent spreading code is needed for use by a DCH channel.

7. A base station node of a radio access network which maintains a code tree of spreading codes that are allocatable between high speed downlink shared channels (HS-DSCH) and dedicated channels (DCH) and monitors use of the spreading codes of the code tree, wherein the base station node comprises:
a data processing and control unit configured to allocate an initial number of spreading codes for use by the HS-DSCH channels and, for a remaining number of spreading codes, the data processing and control unit is further configured to:
allocate the spreading codes to HS-DSCH channels in a first direction across the code tree;
allocate the spreading codes to DCH channels in a second direction across the code tree;
monitor use of the spreading codes of the code tree for determining free spreading codes which are non-adjacent to a spreading code allocated to the HS-DSCH channels; and
allocate a free non-adjacent spreading code to an HS-DSCH channel.

8. The base station node of claim 7, where the data processing and control unit is further configured to determine whether or not to activate a code multiplexing functionality, the code multiplexing functionality facilitating allocating the free, non-adjacent spreading code so that more than one high speed channel user can use the spreading codes.

9. The base station node of claim 8, where the data processing and control unit is further configured to determine whether or not to activate a code multiplexing functionality by monitoring code usage.

10. The base station node of claim 7, where the data processing and control unit is further configured to allocate the free, non-adjacent spreading code so that more than one high speed channel user can use the spreading codes.

11. The base station node of claim 7, where the data processing and control unit is further configured to allocate the free, non-adjacent spreading code so that one user uses the spreading codes by using more than one HS-DSCH channel.

12. The base station node of claim 7, where the data processing and control unit is further configured to release the non-adjacent spreading code from the HS-DSCH channel when the non-adjacent spreading code is needed for use by a DCH channel.

* * * * *

UNITED STATES PATENT AND TRADEMARK OFFICE
CERTIFICATE OF CORRECTION

| | | |
|---|---|---|
| PATENT NO. | : 8,149,792 B2 | |
| APPLICATION NO. | : 12/514964 | |
| DATED | : April 3, 2012 | |
| INVENTOR(S) | : Hu et al. | |

It is certified that error appears in the above-identified patent and that said Letters Patent is hereby corrected as shown below:

On the title page, item (75), under "Inventors", in Column 1, Line 2, delete "Linkoping" and insert -- Linköping --, therefor.

On the title page, item (73), under "Assignee", in Column 1, Line 2, delete "(publ) (SE)" and insert -- (publ), Stockholm (SE) --, therefor.

In Fig. 2, Sheet 2 of 5, for Tag "50", in Line 1, delete "HS-DSDPA" and insert -- HSDPA --, therefor.

In Fig. 2, Sheet 2 of 5, for Tag "40", in Line 1, delete "HS-DSDPA" and insert -- HSDPA --, therefor.

In Fig. 2, Sheet 2 of 5, delete Tag "50" and insert -- 60 --, therefor.

In Fig. 2, Sheet 2 of 5, delete Tag "52" and insert -- 62 --, therefor.

In Fig. 2, Sheet 2 of 5, for Tag "52", delete "CODE SCHEDULER" and insert -- SPREADING CODE SCHEDULER --, therefor.

In Column 2, Line 6, delete "23)." and insert -- 23), --, therefor.

In Column 4, Line 40, delete "tree:" and insert -- tree; --, therefor.

In Column 5, Lines 36-53, delete "in order....of structure." and insert the same at line 35, after "etc." as a continuation of the paragraph.

In Column 6, Line 23, delete "1u" and insert -- Iu --, therefor.

In Column 6, Line 32, delete "regard." and insert -- regard, --, therefor.

In Column 6, Line 36, delete "Moreover." and insert -- Moreover, --, therefor.

Signed and Sealed this
Sixth Day of November, 2012

David J. Kappos
*Director of the United States Patent and Trademark Office*

CERTIFICATE OF CORRECTION (continued)
U.S. Pat. No. 8,149,792 B2

In Column 8, Line 7, delete "Fig. 1" and insert -- Fig. 2, --, therefor.

In Column 9, Line 18, delete "HS-SCHH," and insert -- HS-SCCH, --, therefor.

In Column 9, Line 39, delete "preformed" and insert -- performed --, therefor.

In Column 9, Line 60, delete "IS-DSCH" and insert -- HS-DSCH --, therefor.